US007778226B2

(12) United States Patent
Rayzman et al.

(10) Patent No.: US 7,778,226 B2
(45) Date of Patent: Aug. 17, 2010

(54) DEVICE, SYSTEM AND METHOD OF COORDINATION AMONG MULTIPLE TRANSCEIVERS

(75) Inventors: Giora Rayzman, Rishon LeZion (IL); Oren Kaidar, Binyamina (IL); Miriam Ratner, Ramat-Gan (IL)

(73) Assignee: Intel Corporation, Santa Clara, CA (US)

( * ) Notice: Subject to any disclaimer, the term of this patent is extended or adjusted under 35 U.S.C. 154(b) by 1149 days.

(21) Appl. No.: 11/392,958

(22) Filed: Mar. 30, 2006

(65) Prior Publication Data

US 2007/0238482 A1    Oct. 11, 2007

(51) Int. Cl.
*H04B 7/212* (2006.01)
*H04B 7/00* (2006.01)
*H04J 3/06* (2006.01)
*H04M 1/00* (2006.01)

(52) U.S. Cl. .................... 370/337; 370/350; 455/552.1; 455/553.1; 455/526

(58) Field of Classification Search .............. 455/552.1, 455/553.1, 526, 63.1, 63.2, 67.13, 71, 78, 455/451, 509, 41.2; 370/337, 345, 321–324, 370/350, 503, 504, 328, 329, 331
See application file for complete search history.

(56) References Cited

U.S. PATENT DOCUMENTS

| 5,533,018 | A |   | 7/1996  | DeJager et al. |
|-----------|---|---|---------|----------------|
| 5,923,702 | A |   | 7/1999  | Brenner et al. |
| 5,999,823 | A | * | 12/1999 | Yoneyama et al. ....... 455/552.1 |
| 6,370,114 | B1|   | 4/2002  | Gullicksen et al. |
| 6,600,931 | B2| * | 7/2003  | Sutton et al. ............. 455/552.1 |
| 2002/0067707 | A1 | | 6/2002 | Morales et al. |
| 2002/0068566 | A1 | | 6/2002 | Ohlsson et al. |
| 2002/0082019 | A1 | | 6/2002 | Sunay et al. |
| 2002/0196753 | A1 | | 12/2002 | Famolari |
| 2003/0045272 | A1 | | 3/2003 | Burr |
| 2003/0078062 | A1 | | 4/2003 | Burr |
| 2003/0079003 | A1 | | 4/2003 | Burr |
| 2003/0119509 | A1 | | 6/2003 | Yun |
| 2003/0147370 | A1 | | 8/2003 | Wu |
| 2003/0193911 | A1 | | 10/2003 | Zhao et al. |
| 2005/0135318 | A1 | * | 6/2005 | Walton et al. ............... 370/338 |

(Continued)

OTHER PUBLICATIONS

"Draft IEEE Standrd For Local and Metropolitan Area Networks: Media Independent Handover Services" Lan Man Standards Committee of The IEEE Computer Society. Copyright 2005 by The Institute of Electrical and Electronics Engineers, inc.

(Continued)

*Primary Examiner*—George Eng
*Assistant Examiner*—Wesley L Kim
(74) *Attorney, Agent, or Firm*—Shiloh et al.

(57) ABSTRACT

Some embodiments of the invention provide devices, systems and methods of coordination among multiple transceivers. For example, an apparatus in accordance with an embodiment of the invention includes: a first wireless transceiver able to operate in accordance with a first, non-scheduled, wireless communication protocol; a second wireless transceiver able to operate in accordance with a second, scheduled, wireless communication protocol; and a communication coordinator to allocate one or more first time slots for communication by said first transceiver, and to allocate one or more second time slots, which do not overlap said first time slots, for communication by said second transceiver.

25 Claims, 4 Drawing Sheets

U.S. PATENT DOCUMENTS

| | | | |
|---|---|---|---|
| 2005/0215197 A1 | 9/2005 | Chen et al. | |
| 2005/0282548 A1 | 12/2005 | Kim et al. | |
| 2006/0094431 A1 | 5/2006 | Saifullah et al. | |
| 2006/0227801 A1* | 10/2006 | Nanda et al. | 370/447 |
| 2007/0014269 A1* | 1/2007 | Sherman et al. | 370/338 |
| 2007/0183383 A1* | 8/2007 | Bitran et al. | 370/338 |
| 2007/0230401 A1 | 10/2007 | Rayzman et al. | |
| 2008/0268778 A1* | 10/2008 | De La Garrigue et al. | 455/41.2 |

OTHER PUBLICATIONS

International Search Report and Written Opinion for Application No. PCT/US2007/064491 mailed Sep. 5, 2007.

International Search Report for PCT/US2007/008429, mailed on Sep. 19, 2007.

Office action for U.S. Appl. No. 11/394,180, mailed on Apr. 28, 2009.

Office action for U.S. Appl. No. 11/394,180, mailed on Feb. 19, 2009.

Office action for U.S. Appl. No. 11/394,180, mailed on Sep. 3, 2008.

* cited by examiner

DEVICE, SYSTEM AND METHOD OF COORDINATION AMONG MULTIPLE TRANSCEIVERS

BACKGROUND OF THE INVENTION

In the field of wireless communications, a hybrid wireless communication station may include multiple wireless transceivers, for example, a first wireless transceiver able to operate in accordance with a first wireless communication standard or protocol, and a second transceiver able to operate in accordance with a second wireless communication standard or protocol.

Transmission or reception of wireless communication signals by the first transceiver may interfere with concurrent communication by the second transceiver.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

Figure 1:
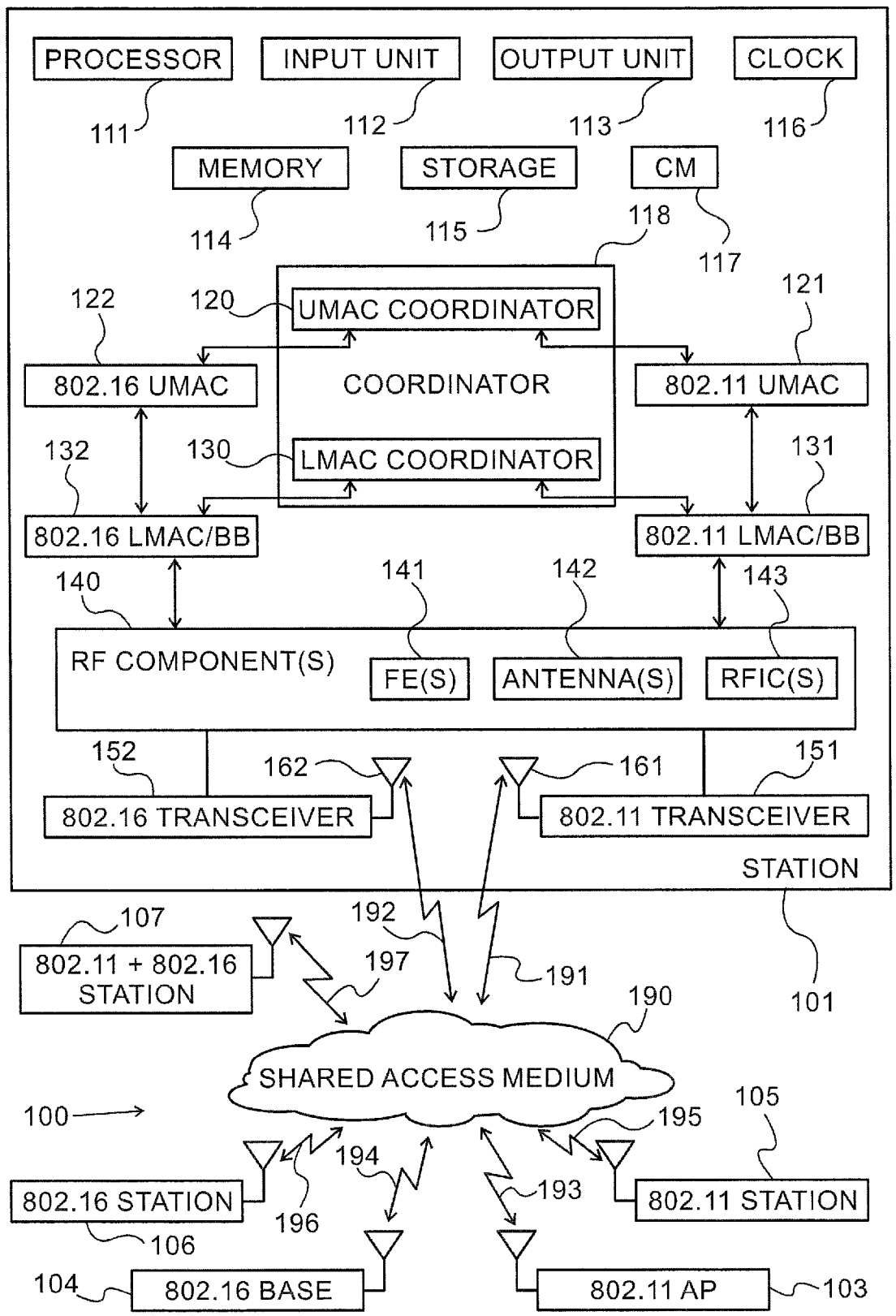
FIG. 1 is a schematic block diagram illustration of a wireless communication system utilizing coordination among multiple transceivers in accordance with an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a personal computer, a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11h, 802.11i, 802.11n, 802.16, 802.16d, 802.16e standards and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth™, Zig-Bee™, or the like. Embodiments of the invention may be used in various other apparatuses, devices, systems and/or networks.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Although embodiments of the invention are not limited in this regard, the term "reduced power mode" as used herein may include, for example, an idle mode, a standby mode, a power conservation mode, a power save mode, an efficiency mode, a "sleep" mode, a semi-operational mode, a semi-active mode, a partially-active mode, or other modes of operations in which a component (e.g., a transceiver or a sub-unit thereof) is not fully operational and/or active.

Although portions of the discussion herein may relate, for demonstrative purposes, to a first transceiver able to operate in accordance with IEEE 802.11 standard (or a derivative thereof), and a second transceiver able to operate in accordance with IEEE 802.16 standard (or a derivative thereof), embodiments of the invention are not limited in this regard, and may be used in accordance with various other types of transceivers and combination thereof, including, for example, Zigbee transceivers, cellular communication transceivers, or the like.

FIG. 1 schematically illustrates a block diagram of a wireless communication system 100 utilizing coordination among multiple transceivers in accordance with an embodiment of the invention. System 100 may include one or more wireless communication stations, for example, a station 101. System 100 may optionally include other wireless devices, for example, an Access Point (AP) 103, e.g., able to operate in accordance with IEEE 802.11 standard; and a base station 104, e.g., able to operate in accordance with IEEE 802.16 standard. System 100 may further, optionally, include other wireless communication stations, for example, a station 105 able to operate in accordance with IEEE 802.11 standard, and a station 106 able to operate in accordance with IEEE 802.16 standard.

In some embodiments, for example, station 101 may be a hybrid wireless communication device, e.g., a station including multiple wireless transceivers able to operate in accordance with multiple, respective, wireless communication standards or protocols, e.g., synchronic and/or asynchronous standards or protocols, scheduled and/or non-scheduled standards or protocols, managed and/or non-managed standards or protocols, burstable and/or non-burstable standards and/or protocols, or the like. For example, in one embodiment, station 101 may include a wireless transceiver 151 able to operate in accordance with IEEE 802.11 standard, and a wireless transceiver 152 able to operate in accordance with IEEE 802.16 standard. In another embodiment, for example, station 101 may include a single hybrid wireless transceiver, for example, able to alternately operate in accordance with a two or more wireless communication standards or protocols (e.g., IEEE 802.11 standard and IEEE 802.16 standard). Other suitable standards or protocols may be used.

System 100 may optionally include more than one hybrid devices, e.g., in addition to station 101. For example, system 100 may further include a hybrid station 107 able to communicate in accordance with IEEE 802.11 standard and in accordance with IEEE 802.16 standard.

Station 101, AP 103, base station 104, station 105, station 106 and station 107 may communicate using a shared access medium 190, for example, through wireless communication links 191-197.

In some embodiments, system 100 may be or may include one or more wireless communication networks, for example, an a-synchronic or asynchronous wireless network, a synchronic wireless network, a managed wireless network, a non-managed wireless network, a burstable wireless network, a non-burstable wireless network, a scheduled wireless network, a non-scheduled wireless network, or the like. For example, in one embodiment, AP 103 and transceiver 151 of station 101 may be able to operate in accordance with a first wireless communication standard, e.g., IEEE 802.11 standard, which may be a-synchronic, asynchronous, burstable, non-managed, non-scheduled, or the like; whereas base station 104 and transceiver 152 of station 101 may be able to operate in accordance with a second wireless communication standard, e.g., IEEE 802.16 standard, which may be synchronic, managed, scheduled, or the like.

Station 101 may include, for example, a processor 111, an input unit 112, an output unit 113, a memory unit 114, and a storage unit 115. Station 101 may further include multiple wireless transceivers, for example, transceivers 151 and 152, and one or more antennas, for example, antennas 161 and 162. Station 101 may optionally include other suitable hardware components and/or software components. In some embodiments, the components of station 101 may be enclosed in, for example, a common housing, packaging, or the like.

Processor 111 may include, for example, a Central Processing Unit (CPU), a Digital Signal Processor (DSP), a microprocessor, a controller, a chip, a microchip, one or more circuits, an Integrated Circuit (IC), or any other suitable multi-purpose or specific processor or controller. Processor 111 may, for example, process signals and/or data transmitted and/or received by station 101.

Input unit 112 may include, for example, a keyboard, a keypad, a mouse, a touch-pad, a stylus, a microphone, or other suitable pointing device or input device. Output unit 113 may include, for example, a Cathode Ray Tube (CRT) monitor or display unit a Liquid Crystal Display (LCD) monitor or display unit, a screen, a monitor, a speaker, or other suitable display unit or output device.

Memory unit 114 may include, for example, a Random Access Memory (RAM), a Read Only Memory (ROM), a Dynamic RAM (DRAM), a Synchronous DRAM (SDRAM), a Flash memory, a volatile memory, a non-volatile memory, a cache memory, a buffer, a short term memory unit, a long term memory unit, or other suitable memory units or storage units. Storage unit 115 may include, for example, a hard disk drive, a floppy disk drive, a Compact Disk (CD) drive, a CD-ROM drive, or other suitable removable or non-removable storage units. Memory unit 114 and/or storage unit 115 may, for example, store data transmitted and/or received by station 101.

Transceiver 151 and/or transceiver 152 may include, for example, a wireless Radio Frequency (RF) transceiver able to transmit and/or receive wireless RF signals, e.g., through antenna 161 and/or antenna 162, respectively. In some embodiments, for example, transceiver 151 and/or transceiver 152 may be implemented using a transmitter, a receiver, a transmitter-receiver, or one or more units able to perform separate or integrated functions of transmitting and/or receiving wireless communication signals, blocks, frames, transmission streams, packets, messages and/or data. In one embodiment, for example, two or more transceivers of station 101 (e.g., transceivers 151-152) may be implemented using a single component, e.g., a dual-transceiver card or modem, a multiple-transceiver card or modem, or the like. Additionally or alternatively, for example, transceivers 151-152 of station 101 may optionally be otherwise collocated within a single common modem, card, packaging, housing, wireless communication unit, wireless communication component, station, apparatus, or the like.

Antenna 161 and/or antenna 162 may include an internal and/or external RF antenna, for example, a dipole antenna, a monopole antenna, an omni-directional antenna, an end fed antenna, a circularly polarized antenna, a micro-strip antenna, a diversity antenna, or any other type of antenna suitable for transmitting and/or receiving wireless communication signals, blocks, frames, transmission streams, packets, messages and/or data.

In some embodiments, station 101 may utilize an orderly Time-Division Multiple Access (TDMA) scheme to coordinate between multiple collocated transceivers, e.g., between the operation of transceiver 151 and the operation of transceiver 152, for example, to avoid or reduce interference among the multiple transceivers. The orderly TDMA scheme may optionally be implemented using a Communication Manager (CM) 117 which may optionally be included in station 101. In some embodiments, CM 117 may be implemented using a hardware component (e.g., a controller, part of transceivers 151 and/or 152, part of processor 111, a stand-alone unit, or the like) and/or a software component (e.g., a stand-alone software component, an application, a driver, a portion of an Operating System (OS) of station 101, or the like). CM 117 may, for example, perform one or more operations to coordinate between the operation of transceiver 151 and the operation of transceiver 152.

In some embodiments, station 101 may utilize an orderly TDMA scheme having an orderly absence mechanism, such that station 101 may be absent from a first wireless network (e.g., IEEE 802.11 network) while station 101 operates in a second wireless network (e.g., IEEE 802.16 network), or vice versa. For example, at a first time slot, transceiver 151 of station 101 may operate (e.g., in accordance with IEEE 802.11 standard) and communicate with AP 103, whereas transceiver 152 of station 101 may not operate and may not communicate with base station 104. Similarly, at a second time slot, transceiver 152 of station 101 may operate (e.g., in accordance with IEEE 802.16 standard) and communicate with base station 104, whereas transceiver 151 of station 101 may not operate and may not communicate with AP 103.

In some embodiments, for example, the orderly TDMA scheme may allow station 101 and/or base station 104 to determine in advance (e.g., prior to the first time slot), that station 101 and/or transceiver 152 are expected to be absent from the second network (e.g., the 802.16 network) during the first time slot; accordingly, substantially no transmission may be performed to or by transceiver 152 during the first time slot. Similarly, the orderly TDMA scheme may allow station 101 and/or AP 103 to determine in advance (e.g., prior to the second time slot), that station 101 and/or transceiver 151 are expected to be absent from the first network (e.g., the 802.11 network) during the second time slot; accordingly, substantially no transmission may be performed to or by transceiver 151 during the second time slot.

Figure 2:
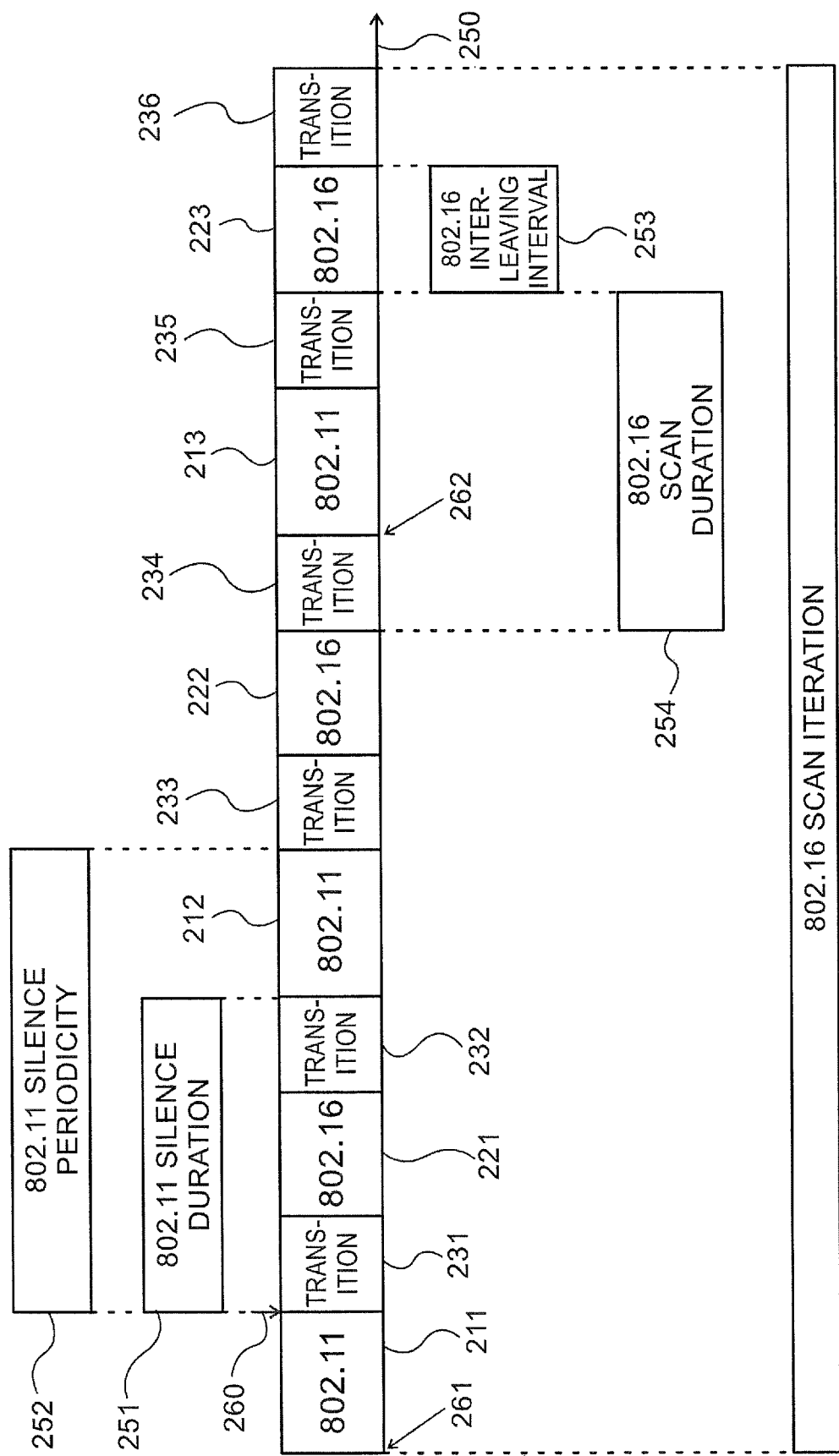
FIG. 2 is a schematic timing diagram of wireless communication signals in accordance with an embodiment of the invention.

Reference is made to FIG. 2, which schematically illustrates a demonstrative example of a timing diagram of wireless communication signals in accordance with an embodiment of the invention. A horizontal axis 250 may indicate, for example, timing of wireless communication signals transmitted or received by station 101 of FIG. 1. For example, blocks 211-213 may indicate time slots in which wireless communication signals are transmitted and/or received by transceiver 151 of FIG. 1 (e.g., the IEEE 802.11 transceiver); blocks 221-223 may indicate time slots in which wireless communication signals are transmitted and/or received by transceiver 152 of FIG. 1 (e.g., the IEEE 802.16 transceiver); and optional blocks 231-236 may indicate optional transition time slots, e.g., time periods in which transceiver 151 and transceiver 152 do not transmit and do not receive wireless communication signals.

As illustrated in FIG. 2, an orderly TDMA scheme may alternate between time slots allocated for different types of communication. For example, a time slot in which a first communication standard is used (e.g., block 211, corresponding to IEEE 802.11 standard) may be followed by a time slot in which a second communication standard is used (e.g., block 221, corresponding to IEEE 802.16 standard). Then, the time slot in which the second communication standard is used (e.g., block 221, corresponding to IEEE 802.16 standard) may be followed by a time slot in which the first communication standard is used (e.g., block 212, corresponding to IEEE 802.11 standard), and so on. In some embodiments, a time slot reserved for IEEE 802.11 communication may not overlap with a time slot reserved for IEEE 802.16 communication, and vice versa.

In some embodiments, during a time slot reserved for IEEE 802.16 communication, the IEEE 802.16 transceiver may be in communicative mode (e.g., may transmit signals and/or may receive signals, may be operational, may be active, or the like), whereas the IEEE 802.11 transceiver may be in non-communicative mode (e.g., may be non-operational, may be absent from the network, may be in reduced power mode, may not transmit signals, may not receive signals, may be inactive, or the like). Similarly, during a time slot reserved for IEEE 802.11 communication, the IEEE 802.11 transceiver may be in communicative mode (e.g., may transmit signals and/or may receive signals, may be operational, may be active, or the like), whereas the IEEE 802.16 transceiver may be in non-communicative mode (e.g., may be non-operational, may be absent from the network, may be in reduced power mode, may not transmit signals, may not receive signals, may be inactive, or the like).

Optionally, transition time slots may be used in between two communication time slots. For example, a transition time slot (block 231) may be used between a time slot in which a first communication standard is used (e.g., block 211, corresponding to IEEE 802.11 standard) and a time slot in which a second wireless communication standard is used (e.g., block 221, corresponding to IEEE 802.16 standard). Similarly, a transition time slot (block 232) may be used between a time slot in which the second communication standard is used (e.g., block 221, corresponding to IEEE 802.16 standard) and a time slot in which the first wireless communication standard is used (e.g., block 212, corresponding to IEEE 802.11 standard), and so on.

In one embodiment, transition time slots may have a constant length; for example, the length of transition time slot 231 may be substantially equal to the length of transition time slot 232. In another embodiment, transition time slots may have various lengths; for example, the length of transition time slots that follow a communication time slot of a first standard, may be different from the length of transition time slots that follow a communication time slot of a second standard.

Referring again to FIG. 1, station 101 may optionally include a coordinator 118 to coordinate between the operations of transceivers 151-152. Coordinator 118 may be implemented, for example, as part of CM 117, as part of transceivers 151-152, as a combination of transceivers 151 and 152, as part of upper Media Access Control (MAC)s 121-122 described herein, as part of lower MAC/BaseBands 131-132 described herein, as a combination of upper MAC 121 and/or upper MAC 122 and/or lower MAC/BB 131 and/or lower MAC/BB 132, as a separate sub-unit of station 101, using software components and/or hardware components, or the like. In some embodiments, the components of coordinator 118 may correspond to various components of transceivers 151-152 or station 101, such that, for example, components of coordinator 118 may correspond to a high-level architecture of transceivers 151-152 or other components of station 101. In some embodiments coordinator 118 may optionally include one or more parts or sub-units of the RF components 140 described herein, e.g., one or more parts or sub-units of RF components 140 which may be shared between transceivers 151-152, or one or more components used exclusively by transceiver 151 or exclusively by transceiver 152.

Coordinator 118 may include, for example, an upper MAC coordinator 120, e.g., a master driver or a coordination application able to define a policy (e.g., a coordination policy, a sharing policy, or the like) used by the orderly TDMA scheme. Coordinator 118 may further include, for example, a lower MAC coordinator 130 able to perform the coordination and/or synchronization operations between transceivers 151-152. The upper MAC coordinator 120 may control, or may communicate with, a first upper MAC 121 (e.g., IEEE 802.11 upper MAC) corresponding to transceiver 151; and may control, or may communicate with, a second upper MAC 122 (e.g., IEEE 802.16 upper MAC) corresponding to transceiver 152. Similarly, lower MAC coordinator 130 may control, or may communicate with, a first lower MAC/BB 131 (e.g., IEEE 802.11 lower MAC/BB) corresponding to transceiver 151; and may control, or may communicate with, a second lower MAC/BB 132 (e.g., IEEE 802.16 lower MAC/BB) corresponding to transceiver 152. The IEEE 802.11 lower MAC/BB 131 may be able to communicate with the IEEE 802.11 upper MAC 121; similarly, the IEEE 802.16 lower MAC/BB 132 may be able to communicate with the IEEE 802.16 upper MAC 122. In some embodiments, the IEEE 802.11 upper MAC 121 and/or the lower MAC/BB 131 may be included in, or may be operatively associated with, the IEEE 802.11 transceiver 151; whereas the IEEE 802.16 upper MAC 122 and/or the lower MAC/BB 132 may be included in, or may be operatively associated with, the IEEE 802.16 transceiver 152.

The lower MAC/BBs 131-132 may utilize one or more shared and/or separate (e.g., exclusive or non-shared) RF components 140, e.g., one or more shared or separate frontends 141, one or more shared or separate antennas 142, one or more shared or separate RF Integrated Circuits (RFICs) 143, or the like. In one embodiment, for example, lower MAC/BBs 131-132 may utilize a shared RF component 140, (for example, shared antenna(s) 142), e.g., since according to the orderly TDMA scheme, lower MAC/BB 131 may not communicate while lower MAC/BB 132 communicates, and lower MAC/BB 132 may not communicate while lower MAC/BB 131 communicates. For example, one or more protocol mechanisms may be used by coordinator 118 to allow transceiver 151 to orderly abandon a first wireless network (e.g., IEEE 802.11 network) when transceiver 152 is expected to communicate in a second wireless network (e.g., IEEE 802.16 network) in accordance with the orderly TDMA scheme, or vice versa. Accordingly, for example, only one of transceivers 151-152 may utilize the shared RF component(s) 140 at a certain time slot. In another embodiment, lower MAC/BB 131 may utilize a first set of RF components 140, whereas lower MAC/BB 132 may utilize a second, separate, set of RF components 140.

Although FIG. 1 shows, for demonstrative purposes and for clarity of description, transceivers 151-152, lower MAC/BBs 131-132 and upper MACs 121-122 as separate components or modules, embodiments of the invention are not limited in this regard. For example, in some embodiments, some components of station 101 may be implemented using "physical" units, whereas other components of station 101 may be implemented using "logical" units or modules. In one embodiment, for example, transceiver 151 may include lower MAC/BB 131, may optionally include upper MAC 121, and may further optionally include one or more parts of RF component(s) 140; similarly, for example, transceiver 152 may include lower MAC/BB 132, may optionally include upper MAC 122, and may further optionally include one or more parts of RF component(s) 140. Other implementations of separate, integrated and/or combined units, physical units and/or logical modules may be used.

In some embodiments, the orderly TDMA scheme may not allow simultaneous or concurrent IEEE 802.11 and IEEE 802.16 communication, or may allow either exclusive IEEE 802.11 communication or exclusive IEEE 802.16 communication at a certain time slot. In other embodiments, the orderly TDMA scheme may allow simultaneous or concurrent IEEE 802.11 and IEEE 802.16 communication, for example, by scheduling such communications in a non-overlapping time-division. In some embodiments, for example, IEEE 802.16 communication may be performed substantially simultaneously and/or concurrently with IEEE 802.11 communication, or vice versa, e.g., if non-shared RF component(s) 140 are utilized, if exclusive or separate RF component(s) 140 are utilized, and/or if RF component(s) 140 allow sharing during concurrent IEEE 802.11 and IEEE 802.16 communications.

Upper MAC coordinator 120 may define the coordination policy, for example, based on an analysis of requirements and/or characteristics of one or more applications which may be executed by station 101, e.g., taking into account the priority required by such application(s), taking into account the Quality of Service (QoS) required by such applications, taking into account the type of such application(s) (e.g., a Voice Over Internet Protocol (VoIP) application, an Internet browsing application, or the like), taking into account the bandwidth required by such application(s) and/or other suitable parameters or criteria. The coordination policy may be dynamically re-defined or modified, e.g., periodically, upon demand, when a pre-defined condition is met, or the like. The policy may indicate, for example, an orderly TDMA such that only one of transceivers 151-152 may utilize the RF component(s) 140 at a certain time slot, or that only one of lower MAC/BBs 131-132 may utilize the RF component(s) 140 at a certain time slot.

The coordination policy may include, for example, one or more parameters corresponding to the operation of transceivers 151-152, the operation of lower MAC/BBs 131-132, and/or the utilization of RF component(s) 140 (e.g., shared RF component(s) 140) by lower MAC/BBs 131-132. The definition of the coordination policy may take into account, for example, sharing cycle or meta-frame information, the requirements or parameters of one or more applications executed by station 101 (e.g., a vocoder cycle used for VoIP conversations by a VoIP application), or the like. The coordination policy may define, for example, that a first time slot may be allocated for exclusive communication of transceiver 151, a second time slot may be allocated for exclusive communication of transceiver 152, and so on; optionally utilizing transition time slots to separate between communication time slots. In some embodiments, additionally or alternatively, the coordination policy may optionally include or define other attributes or parameters, for example, a size of a cycle used for alternate communications of transceiver 151 and transceiver 152 (e.g., a "super-cycle" or a combined cycle), a size or a percentage (e.g., of the combined cycle) of time slots reserved for alternate communications of transceiver 151 and transceiver 152, definitions or attributes to resolve a conflict or to establish precedence or priority in case of overlapping time slots, a list or time slots, or the like.

In some embodiments, for example, the orderly TDMA scheme may utilize orderly absence from a first wireless network, while being active and operational in a second network; the orderly TDMA scheme may provide to a user of station 101 a perception that the user is concurrently fully active on both the first and second networks, e.g., without disrupting the QoS required by the user or by applications executed by station 101.

In some embodiments, transceivers 151 and 152 may be synchronized or co-synchronized, e.g., may share a common timing mechanism, or may have or may utilize a timing synchronization mechanism. For example, in one embodiment, transceivers 151 and 152 may be operatively connected to a clock 116, e.g., of station 101 and/or of processor 111, which may provide a common timing mechanism for transceivers 151 and 152. In another embodiment, for example, software-based and/or hardware-based synchronization mechanisms may be used to synchronize between transceivers 151 and 152, or between lower MAC/BBs 131-132.

The lower MAC/BB 131 may define or set one or more parameters, which may be examined or analyzed by the lower MAC/BB 132, or vice versa, e.g., utilizing the lower MAC coordinator 130. For example, parameters set by lower MAC/BB 131 may include: a limitation parameter indicating a beginning of an access of lower MAC/BB 131 to the RF component(s) 140; a duration parameter indicating the duration of the access of the lower MAC/BB 131 to the RF component(s) 140; a guard time parameter indicating a time period required for lower MAC/BB 131 to be brought out of a reduced power mode prior to operation; a priority parameter indicating a priority of the current operation, e.g., with respect to the wireless network; and/or other parameters. In some embodiments, for example, the value of the guard time parameter may be taken into account when calculating whether or not lower MAC/BB 131 has a sufficient time slot to be brought out of a reduced power mode and then to perform a communication operation.

In some embodiments, for example, the priority parameter may be used to determine which one of lower MAC/BBs 131-132 may utilize the RF component(s) 140 when both lower MAC/BBs 131-132 contend for using the RF component(s) 140 during the same time slot or during overlapping time slots; for example, operations may be assigned priority values which may be mapped to a common scale (e.g., a scale of 1 to 4), and a resolution may be made based on the scaled level of priority; optionally, a global conflict resolution parameter (e.g., determined by the upper MAC coordinator 120 and defined as part of the coordination policy) may be used to resolve concurrent contentions for RF component(s) 140 by lower MAC/BBs 131-132. In some embodiments, an orderly TDMA scheme may suffice to substantially eliminate concurrent contentions for RF component(s) 140 by lower MAC/BBs 131-132, for example, utilizing the orderly absence from the wireless network as indicated by the limitation parameter, the duration parameter and the guard time parameter.

In some embodiments, transceiver 151 may examine the set of parameters of transceiver 152, to determine an upcoming time slot in which transceiver 152 is expected to be absent from the wireless network (e.g., an upcoming time slot in which transceiver 152 is not expected to transmit and/or receive signals), such that transceiver 151 may operate (e.g., transmit and/or receive signals, utilizing the RF component(s) 140) during that upcoming time slot. Until that upcoming time slot, transceiver 151 or one or more sub-units thereof may be in a reduced power mode. Optionally, transceiver 151 may enter the reduced power mode after exchanging one or more required protocol messages with AP 103, for example, such that signals are not transmitted to transceiver 151 and are not expected to be received from transceiver 151 during its reduced power period.

Similarly, transceiver 152 may examine the set of parameters of transceiver 151, to determine an upcoming time slot in which transceiver 151 is expected to be absent from the wireless network (e.g., an upcoming time slot in which transceiver 151 is not expected to transmit and/or receive signals), such that transceiver 152 may operate (e.g., transmit and/or receive signals, utilizing the RF component(s) 140) during that upcoming time slot. Until that upcoming time slot, transceiver 152 or one or more sub-units thereof may be in a reduced power mode. Optionally, transceiver 152 may enter the reduced power mode after exchanging one or more required protocol messages with base station 104, for example, such that signals are not transmitted to transceiver 152 and are not expected to be received from transceiver 152 during its reduced power period.

At the beginning of the time slot allocated for communication of transceiver 151, or shortly prior to that time slot (e.g., a time period prior to the allocated time slot to allow transceiver 151 to be brought out of its reduced power mode), transceiver 151 (or one or more components thereof which are in a reduced power mode) may be brought out of reduced power mode, and transceiver 151 may communicate (e.g., transmit and/or receive signals) during that time slot. Additionally, during that time slot, transceiver 152 may not transmit and/or receive signal, and may optionally be in reduced power mode.

Figure 3:
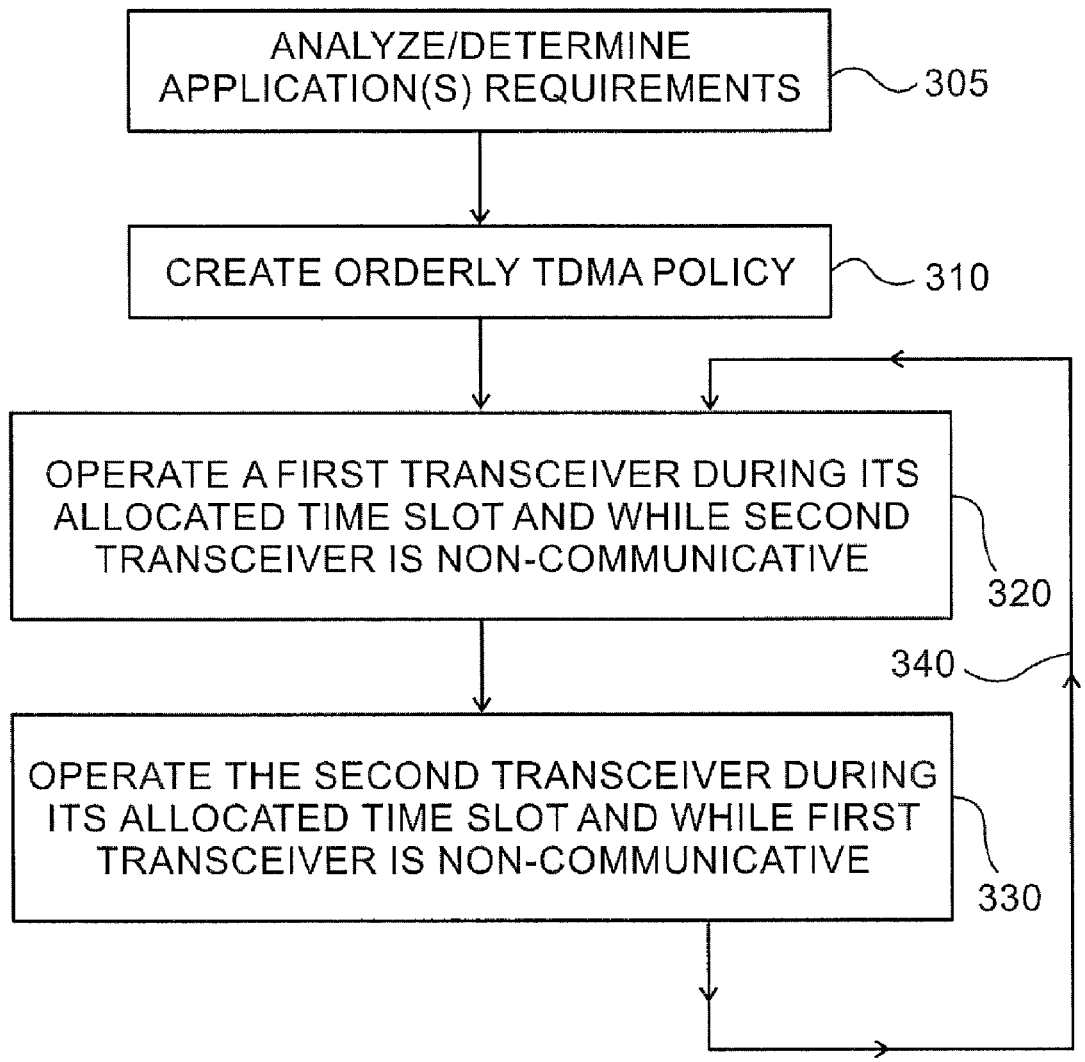
FIG. 3 is a schematic flow-chart of a method of coordination among multiple transceivers in accordance with an embodiment of the invention.

FIG. 3 is a schematic flow-chart of a method of coordination among wireless transceivers in accordance with an embodiment of the invention. Operations of the method may be implemented, for example, by system 100 of FIG. 1, by station 101 of FIG. 1, and/or by other suitable transceivers, units, stations, devices, and/or systems.

As indicated at box 305, the method may include, for example, analyzing one or more application(s) executed by a wireless communication device or by a computing system (e.g., including or utilizing station 101 of FIG. 1), e.g., to determine requirements (e.g., bandwidth requirements, QoS requirements, or the like) of such application(s).

As indicated at box 310, the method may include, for example, creating an orderly TDMA policy between a first transceiver able to operate in accordance with a first wireless communication standard or protocol (e.g., IEEE 802.11 standard) and a second (e.g., collocated in a common device) transceiver able to operate in accordance with a second wireless communication standard or protocol (e.g., IEEE 802.16 standard). This may optionally include, for example, creating a priority policy, for example, to avoid or resolve a conflict or to establish precedence or priority in case of overlapping time slots. The creation of the orderly TDMA policy may be based on, or may take into account, the analysis or determination of requirements of one or more application(s).

As indicated at box 320, the method may include, for example, operating the first transceiver during a first time slot allocated for its communication according to the orderly TDMA policy, and/or during a time interval in which the second transceiver is non-communicative or absent from its wireless network, and/or during a partial or complete time interval freed-up by the second transceiver for communication of the first transceiver. During the first time slot, the second transceiver may not communicate, may be non-operational, and/or may be in reduced power mode.

As indicated at box 330, the method may include, for example, operating the second transceiver during a second time slot allocated for its communication according to the orderly TDMA policy, and/or during a time interval in which the first transceiver is non-communicative or absent from its wireless network, and/or during a partial or complete time interval freed-up by the first transceiver for communication of the second transceiver. During the second time slot, the first transceiver may not communicate, may be non-operational, and/or may be in reduced power mode.

As indicated by arrow 340, the method may include, for example, repeating some or all of the above operations, e.g., alternating between communication by the first transceiver while the second transceiver is non-communicative, and communication by the second transceiver while the first transceiver is non-communicative.

Optionally, a transition time slot may be utilized between the alternating communication time slots, for example, between the operation of box 320 and the operation of box 330, and/or between the operation of box 330 and the repeated operation of box 320.

Other operations or sets of operations may be used in accordance with embodiments of the invention.

Referring again to FIG. 1, station 101 may operate as a "muting" or "silencing" manager able to "mute" (e.g., able to silence) one or more other IEEE 802.11 stations (e.g., IEEE 802.11 station 105) during time slots allocated for IEEE 802.16 communication (e.g., of transceiver 152, of base station 104, or of IEEE 802.16 station 106). For example, station 101 may "mute" (e.g., may silence) IEEE 802.11 station 105 (e.g., using a suitable IEEE 802.11 mechanism), and may further "mute" (e.g. may further silence) its IEEE 802.11 transceiver 151 during a time slot reserved for IEEE 802.16 according to the orderly TDMA scheme. In some embodiments, for example, station 101, operating as a "muting" or "silencing" manager, may instruct one or more other IEEE 802.11 stations to avoid IEEE 802.11 communication (e.g., transmission and/or reception) during time slots reserved for IEEE 802.16 communication; based on the "muting" or "silencing" instruction or indication received from station 101, the other IEEE 802.11 stations may avoid communication during time slots reserved for IEEE 802.16 communication. In some embodiments, station 101 may utilize its IEEE 802.11 transceiver to "mute" or silence one or more other IEEE 802.11 stations; and after the silencing or "muting" of the other IEEE 802.11 station(s) is achieved or acknowledged, station 101 may then "mute" or silence its IEEE 802.11 transceiver.

In some embodiments, for example, station 101 may transmit (e.g., using its IEEE 802.11 transceiver 151) to station 105 an indication that a certain time slot is reserved for IEEE 802.16 communication, and that station 105 is required to avoid IEEE 802.11 communication, or be non-communicative, during such time slots. The indication may be, for example, a particular indication related to one or more time slots reserved for IEEE 802.16 communication; or may be a general indication which may notify station 105 of characteristics of repeating time slots which are reserved for IEEE 802.16 communication. In one embodiment, station 101 may transmit one or more suitable IEEE 802.11 messages, control messages and/or indications in order to "mute" or "silence" other IEEE 802.11 stations during the time slots reserved for IEEE 802.16 communication; for example, station 101 may transmit "quiet period" control messages, in accordance with IEEE 802.11 standard and/or its derivatives, in order to instruct other IEEE 802.11 stations about the required ""silence period". In another embodiment, station 101 may transmit messages, control messages and/or indications which may not be in accordance with IEEE 802.11 standard, e.g., may utilize out-of-band control signals and/or proprietary signals, in order to "mute" or "silence" other IEEE 802.11 stations during the time slots reserved for IEEE 802.16 communication.

In some embodiments, for example, station 101 may operate as a "muting" or "silencing" manager and may announce or notify to other stations in its IEEE 802.11 cell (e.g., to station 105) one or more properties of a "silence period", in which substantially the entire IEEE 802.11 cell (e.g., including station 105) is required or requested to be non communicative, and which corresponds to a time slot reserved by the orderly TDMA scheme to IEEE 802.16 communication. The notification may be performed, for example, using a dedicated transmission from station 101 to station 105, or using a general transmission by 101 to other IEEE 802.11 devices, e.g., utilizing a beacon frame or a probe response. In some embodiments, for example, station 101 may operate as an IEEE 802.11 Access Point (AP) in order to coordinate the communication of substantially the entire IEEE 802.11 cell (e.g., including other IEEE 802.11 devices) with the orderly TDMA scheme used by station 101. For example, station 101 may define a "silence period" across the IEEE 802.11 cell, which may correspond to a time slot reserved for IEEE 802.16 communication and a transition time from IEEE 802.11 communication to IEEE 802.16 communication and vice versa, and in which other IEEE 802.11 devices across the IEEE 802.11 cell may not communicate.

The notification of the "silence period" may be in accordance with IEEE 802.11 standard, and may include one or more attributes or parameters, for example, a "silence period start time" parameter indicating a time stamp in which a transition begins from IEEE 802.11 communication to IEEE 802.16 communication, or indicating a time stamp corresponding to an ending of a time slot allocated for IEEE 802.11 communication, or indicating a time stamp corresponding to a beginning of a time slot allocated for IEEE 802.16 communication. The "silence period" notification may further include a "silence duration" parameter, indicating the length of the "silence period" (block 251 in FIG. 2), e.g., corresponding to a length of a time slot allocated for IEEE 802.16 communication as well as two transition time slots (e.g., a first transition time slot prior to the IEEE 802.16 slot, and a second transition time slot following the IEEE 802.16 time slot). The beginning of the IEEE 802.11 "silence period" is indicated by arrow 260 in FIG. 2.

The "silence period" notification may further include a "silence periodicity" parameter, corresponding to the length of a combined cycle (e.g., "super-cycle") (block 252 in FIG. 2) that includes a time slot allocated for IEEE 802.11 communication and a time slot allocated for IEEE 802.16 communication, and may further optionally include two transition time slots, namely, a first transition time slot following the IEEE 802.11 time slot, and a second transition time slot following the IEEE 802.16 time slot; the "periodicity" parameter may correspond, for example, to a time period between the beginning of a first "silence period" and the beginning of a consecutive "silence period".

Station 105 may receive the "silence period" notification, and based on the received parameters, may be non-communicative and/or non-operational and/or in reduced power mode during the required "silence period". For example, station 105 may avoid transmitting and/or receiving signals in accordance with IEEE 802.11 standard during the required "silence period(s)" as instructed or indicated by station 101, thereby allowing IEEE 802.16 communication during such "silence period(s)" of the IEEE 802.11 devices of system 100.

In some embodiments, the IEEE 802.11 "silence period" may be implemented with regard to substantially all frequency bands in which an IEEE 802.11 may operate, e.g., the 2.4 GHz band used by IEEE 802.11b transceivers and IEEE 802.11g transceivers, as well as the 5 GHz band and/or the 5.2 GHz band used by IEEE 802.11a and/or IEEE 802.11n transceivers.

Optionally, station 101 may request that other IEEE 802.16 devices of system 100 (e.g., the IEEE 802.16 base station 104, and optionally the IEEE 802.16 station 106 using out-of-band and/or proprietary control messages) communicate using the IEEE 802.16 during the time slots allocated for IEEE 802.16 communication, and avoid transmitting and/or receiving information using the IEEE 802.16 standard during the time slots reserved for IEEE 802.11 communication. For example, in some embodiments, the IEEE 802.16 transceiver 152 of station 101 may transmit a periodic scan request (and/or a sleep request) including a "scan duration" parameter corresponding to a length of a time slot allocated for IEEE 802.11 communication as well as two transition time slots, e.g., a first transition time slot prior to the IEEE 802.11 slot, and a second transition time slot following the IEEE 802.11 time slot (indicated by block 254 in FIG. 2). In other embodiments, for example, the IEEE 802.16 transceiver 152 of station 101 may transmit a sleep request with similar parameters (e.g., an "initial sleep window" instead of a "scan duration" parameter) and/or other IEEE 802.16 protocol messages (e.g., an idle mode initiation request) to request an orderly absence from the IEEE 802.16 network during the time slot(s) reserved for IEEE 802.11 communication.

Additionally or alternatively, a periodic scan request (or other IEEE 802.16 control messages, a sleep request, an idle request, or the like) transmitted by the IEEE 802.16 transceiver 152 of station 101 may include an "interleaving interval" parameter corresponding to the length of a time slot allocated for IEEE 802.16 communication (block 253 in FIG. 2); and a "scan iteration" parameter corresponding to an estimated time of a combined cycle (e.g., "super-cycle") of IEEE 802.16 and IEEE 802.11 communication, e.g., measured in seconds or minutes and including multiple IEEE 802.16 time slots and multiple IEEE 802.11 time slots (block 255 in FIG. 2). In some embodiments, for example, after one or more "scan iterations", one or more of the communication parameters may be modified by station 101, e.g., based on bandwidth requirements or other requirements of applications executed by station 101.

An orderly TDMA scheme in accordance with some embodiments of the invention may be utilized in addition to, or instead of, other orderly TDMA mechanisms and/or priority-based TDMA schemes. In one embodiment, for example, a priority-based TDMA mechanism may be implemented such that a priority is raised sufficient time in advance, e.g., to allow exchange of protocol messages which may be required by the mechanism.

In some embodiments, an orderly TDMA scheme may be used to avoid or reduce RF interference between collocated wireless transceivers, e.g., transceivers 151 and 152. In other embodiments, an orderly TDMA scheme may be used to avoid or reduce RF interference between neighboring transceivers, e.g., station 105 and transceiver 151 of station 101, or station 106 and transceiver 152 of station 101. In some embodiments, for example, the coordinated silencing of IEEE 802.11 devices may optionally reduce mutual interference among various different IEEE 802.11 devices.

In some embodiments, optionally, an IEEE 802.11 Independent Basic Service Set (IBSS) cell (an "ad-hoc network") may be created, joined, maintained and/or managed by station 101, e.g., an IBSS cell including the IEEE 802.11 transceiver 151 of station 101 and the IEEE 802.11 station 105. Although two stations 101 and 105 are shown for demonstrative purposes, more than two IEEE 802.11 stations may be included in the IEEE 802.11 IBSS cell. In some embodiments, station 101 may enforce one or more IBSS cell parameters on the IBSS cell; such enforcement may optionally be, for example, in accordance with an orderly TDMA scheme used by station 101, or independent of (and not requiring) such orderly TDMA scheme.

Station 101 may be required to be substantially concurrently active in both an IEEE 802.16 network (e.g., using transceiver 152 of station 101, which may communicate with base station 104) and the IEEE 802.11 IBSS cell (e.g., using transceiver 151 of station 101, which may communicate with station 105 over the IBSS cell). Station 101 may periodically be absent from the IEEE 802.11 IBSS cell and, alternately, may periodically be absent from the IEEE 802.16 network, e.g., in accordance with an orderly TDMA scheme. For example, prior to leaving the IEEE 802.11 IBSS cell, station 101 may notify one or more other stations of the IBSS cell (e.g., station 105) of the expected absence of station 101 from the IBSS network cell.

The IEEE 802.11 IBSS cell may operate without utilizing a central management device for the IBSS cell. For example, a station initiating the IBSS cell may define one or more parameters or attributes of the IBSS cell, e.g., a beacon interval or an Ad-hoc Traffic Indication Message (ATIM) window (e.g., alerting a station in a "sleep" mode that a packet awaits delivery), QoS parameters, or the like. Subsequent IEEE 802.11 stations that join the IBSS cell may adopt the IBSS cell parameters defined by the IBSS cell initiator, and may operate accordingly.

In some embodiments, for example, IEEE 802.11 station 105 may initiate an IBSS cell, and station 101 (e.g., using transceiver 151) may join the IBSS cell. However, the IBSS cell parameters defined by station 105 may not allow station 101 to operate in accordance with its orderly TDMA scheme which allocates certain time slots for IEEE 802.11 communication (using transceiver 151) and other time slots form IEEE 802.16 communication (using transceiver 152). Additionally or alternatively, the IBSS cell parameters defined by station 105 may require a relatively high performance overhead by station 101, which operates in both the IEEE 802.11 IBSS cell and the IEEE 802.16 network.

In some embodiments, station 101 may set, modify or re-define one or more parameters of the IEEE 802.11 IBSS cell, such that the operation of the IBSS cell is in accordance with an orderly TDMA scheme used by one or more hybrid devices (e.g., station 101 having transceivers 151 and 152) able to operate in the IEEE 802.16 network and the IEEE 802.11 IBSS cell. The setting or modification of the IBSS cell parameter(s) may allow, for example, improved performance of the hybrid device(s) (e.g., station 101), may reduce overhead for such hybrid device(s), and/or may reduce overhead for transition of the hybrid device(s) from IEEE 802.11 communication to IEEE 802.16 communication or vice versa.

For example, station 101 may join an IEEE 802.11 IBSS cell created by station 105, and may check whether the IBSS cell parameters allow station 101 to operate efficiently in both the IEEE 802.11 IBSS cell and the IEEE 802.16 network. If the checking result is positive, station 101 may maintain the IBSS cell parameters substantially unmodified. In contrast, if the checking result is negative, station 101 may modify or re-define one or more of the IBSS cell parameters, such that the modified IBSS cell parameters allow station 101 to operate efficiently in both the IEEE 802.11 IBSS cell and the IEEE 802.16 network. For example, if the checking result is negative, the joining station (e.g., station 101) may initiate a new IBSS cell having a Timing Synchronization Function (TSF) value greater than the value of the current TSF of the IBSS cell; the newly initiated IBSS cell may have the parameters required to implement the orderly TDMA scheme. The setting of the new, greater, TSF value may force the previous IBSS cell to coalesce to the newly-initiated IBSS cell, e.g., using an IBSS coalescing method, e.g., such that two IBSS cells having the same Service Set Identifier (SSID) coalesce into a single IBSS cell which is the IBSS cell having the greater TSF value.

In other embodiments, station 101 (and not, for example, station 105) may initiate the IEEE 802.11 IBSS cell. In such initiation, station 101 may set or define IBSS cell parameters that allow station 101 to operate efficiently in both the IEEE 802.11 IBSS cell and the IEEE 802.16 network. In some embodiments, optionally, station 101 may periodically check whether the IBSS cell parameters allow station 101 to operate efficiently in both the IEEE 802.11 IBSS cell and the IEEE 802.16 network; and if the checking result is negative, station 101 may modify or re-define one or more of the IBSS cell parameters.

In some embodiments, for example, station 101 may transmit, using IEEE 802.11 transceiver, a Clear To Send (CTS) to Self (CTS-to-Self) frame, e.g., in order to protect a time slot reserved for IEEE 802.16 communication according to the orderly TDMA scheme in use. The duration of the time period protected by the CTS-to-Self frame may include, for example, a time slot reserved for IEEE 802.16 communication, a transition time slot prior to the IEEE 802.16 time slot, and a short guard time of Transmission Opportunity (TxOP). The TxOP parameter may be enforced by station 101 (e.g., operating as a "master" of the IBSS cell) as an IBSS cell-wide parameter, for example, to avoid lengthy transmission(s) by other IEEE 802.11 stations.

In some embodiments, for example, the enforced TxOP parameter may prevent a lengthy IEEE 802.11 transmission beginning prior to the guard time and extending into the transition time slot or into the time slot reserved for IEEE 802.16 communication. In some embodiments, for example, a short TxOP time period (e.g., minimal or relatively short) may be set by station 101, in order to limit the length of a single continuous transmission of another IEEE 802.11 station participating in the IEEE 802.11 IBSS cell. For example, a relatively short TxOP time period may be set and enforced by station 101, e.g., to accommodate the orderly TDMA scheme in use, and/or to ensure that a transmission by an IEEE 802.11 station does not prolong, extend or exceed into a time slot reserved for IEEE 802.16 communication. In some embodiments, the short TxOP may allow station 101 to gain control of the IEEE 802.11 network prior to the beginning of the IEEE 802.16 time slot. The duration of protection obtained by the CTS-to-Self frame may be calculated by station 101, for example, based on one or more of the "silence period" parameters defining a requested "silence period" of the IEEE 802.11 IBSS cell, e.g., the start time of the silence period (e.g., the beginning of the time slot reserved for IEEE 802.16 communication), the duration of the silence period, the periodicity of the silence period, or the like.

In some embodiments, station 101 may transmit the CTS-to-Self frame towards the end of a time slot reserved for IEEE 802.11 communication, e.g., after a Priority Inter-Frame Space (Priority IFS or PIFS) waiting time, a complete PIFS waiting time, or only a portion of a PIFS waiting time (e.g., immediately prior to the end of the PIFS waiting time). For example, in some embodiments, the CTS-to-Self frame may be transmitted by transceiver 151 of station 101 prior to the end of the PIFS waiting time, e.g., to ensure that the station 101 transmits prior to other IEEE 802.11 stations which may contend for the shared access medium 190. In some embodiments, the CTS-to-Self frame may be transmitted by station 101 a PIFS time after the shared access medium 190 is freed, or substantially immediately prior to the ending of the PIFS time, thereby allowing station 101 to gain control and/or priority of the freed shared access medium 190.

In some embodiments, for example, a TxOP value may be set by station 101 to enforce a maximal transmission length across the IBSS cell; based on the TxOP value, a time period (e.g., which may equal to the TxOP value) prior to the beginning of a subsequent IEEE 802.16 time slot, stations of the IEEE 802.11 IBSS cell may begin to seek an end of the IEEE 802.11 transmission; substantially a FIPS time after the end of the IEEE 802.11 transmission, the CTS-to-Self frame may be transmitted by station 101.

In some embodiments, station 101 may set the IBSS cell parameters such that a beacon interval may be a time period corresponding to a combined cycle of IEEE 802.11 and IEEE 802.16, or to an integer multiple of such combined cycle. For example, a combined cycle may include a time slot allocated for IEEE 802.11 communication, a transition time slot, a time slot allocated for IEEE 802.16 communication, and another time slot. For example, arrow 261 in FIG. 2 indicates the timing of a first beacon signal (e.g., indicating a first Targeted Beacon Transmission Time (TBTT)), whereas arrow 262 in FIG. 2 indicates the timing of a second, subsequent, beacon signal (e.g., indicating a second, subsequent, TBTT).

In some embodiments, station 101 may optionally transmit (using IEEE 802.11 transceiver 151) a "quiet" information element, e.g., included in a periodical beacon signal. The value of the "quiet" information element may correspond to a time slot allocated to IEEE 802.16 communication and two transition time slots. The "quiet" information element may include one or more parameters to represent one or more attributes of the required "silence period", for example, a silence duration parameter (block 251 of FIG. 2), a silence periodicity parameter (block 252 of FIG. 2), and/or other parameters.

In some embodiments, a synchronization mechanism may be used among multiple hybrid stations of the IBSS cell, for example, to select a station that may act as a "master", may determine the cycle of IEEE 802.11 and IEEE 802.16 communications, may determine and set the IBSS cell parameters according to an orderly TDMA scheme in use. The synchronization may be used, for example, to allow multiple hybrid stations (e.g., station 101 and station 107) to utilize both IEEE 802.11 communication and IEEE 802.16 communication in accordance with an orderly TDMA scheme which may be uniform across the IBSS cell.

For example, one of the hybrid stations, e.g., station 101, may operate as a "master" station, whereas other stations (e.g., other hybrid stations) of the IBSS cell may operate as "slave" stations (e.g., station 107). The master station 101 may set the IBSS cell parameters, may transmit the CTS-to-Self frames (e.g., to protect the IEEE 802.16 time slots from IEEE 802.11 communication), and may set "silence period" parameters utilized in IEEE 802.16 communications. The master station 101 may perform these settings, for example, upon initiation of the IBSS cell by the master station 101. In some embodiments, for example, only one station in the IEEE 802.11 IBSS cell (for example, only station 101, and not station 107) may transmit CTS-to-Self frames. Other hybrid stations (e.g., station 107) may utilize the parameters set by master station 101, and may synchronize or modify their operation based on the parameters set by master station 101.

In some embodiments, a recovery mechanism may be used, for example, to recover from a failure or loss of CTS-to-Self frame, or to recover when the IBSS cell initiator or "master" (e.g., station 101) leaves the IBSS cell. For example, the remaining hybrid devices of the IBSS cell (e.g., station 107 and other hybrid stations) may utilize a random or pseudo-random back-off procedure until the scheduled beginning of the subsequent time slot reserved for IEEE 802.16 communication. One of the remaining hybrid devices (e.g., the first of the remaining hybrid devices to end its back-off procedure)

may send the first CTS-to-Self frame, and may operate as a "master" station for the IBSS cell.

If the hybrid station that previously operated as a "master", e.g., station 101, is communicative again (e.g., if station 101 did not leave the IBSS cell, but rather, the CTS-to-Self frame failed or was lost), then station 101 may no longer operate as a "master" station, since another hybrid station (e.g., station 107) operates as a "master" station. For example, station 101 may receive a CTS-to-Self frame corresponding to the IEEE 802.16 communication time slot, which may be transmitted by station 107; and station 101 may thus determine that station 107 operates as a "master" station for the IBSS cell.

Although portions of the discussion herein may relate, for demonstrative purposes, to transmission of CTS-to-Self frames and/or to utilizing a TxOP parameter, other suitable mechanisms or protocol mechanisms may be used in accordance with embodiments of the invention to implement operation according to an orderly TDMA scheme.

Figure 4:
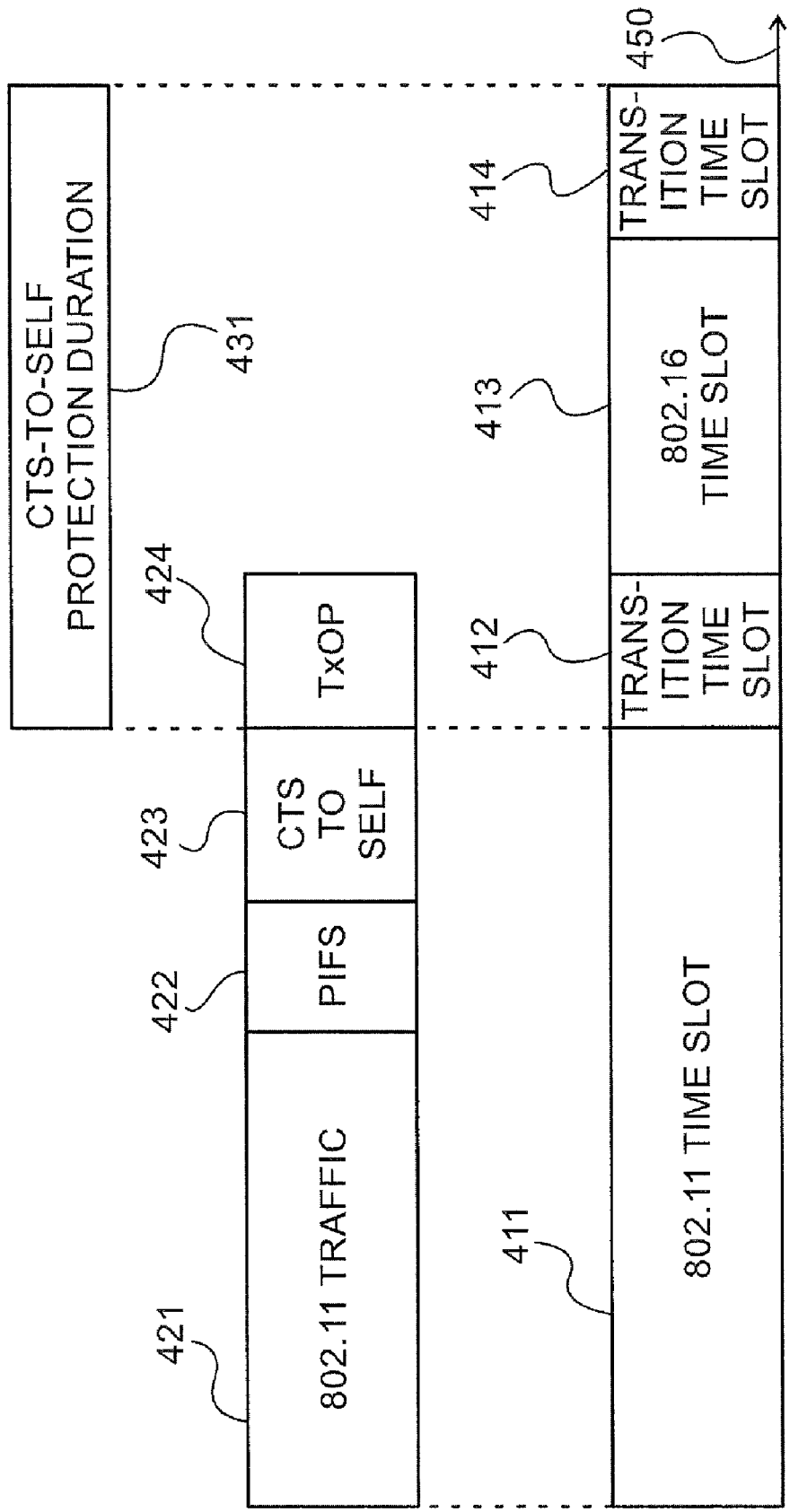
FIG. 4 is a schematic timing diagram of wireless communication signals in accordance with another embodiment of the invention.

Reference is made to FIG. 4, which schematically illustrates a timing diagram of wireless communication signals in accordance with another embodiment of the invention. A horizontal axis 450 may indicate, for example, timing of wireless communication signals transmitted or received by station 101 of FIG. 1. For example, block 411 may indicate a time slot reserved for IEEE 802.11 communication (e.g., using transceiver 151 of FIG. 1), block 412 may indicate a transition time slot, block 413 may indicate a time slot reserved for IEEE 802.16 communication (e.g., using transceiver 152 of FIG. 1), and block 414 may indicate another transition time slot.

The time slot reserved for IEEE 802.11 communication (block 411) may include multiple portions, for example, corresponding to blocks 421-423. For example, the time slot reserved for IEEE 802.11 communication may include a first portion (block 421) in which data is transmitted and/or received using IEEE 802.11 standard; a second portion (block 422) corresponding to a PIFS waiting time; and a third portion (block 423) in which a CTS-to-Self frame may be transmitted.

Block 431 indicates the duration of the protection of IEEE 802.16 communication achieved by the CTS-to-Self frame mechanism, e.g., the time period in which substantially no IEEE 802.11 may be performed; this time period (block 431) may correspond, for example, to the total of the duration of the IEEE 802.16 time slot (block 413), the duration of the first transition time slot (block 412), the duration of the second transition time slot (block 414), and the duration of the TxOP guard time (block 424).

Some embodiments of the invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors or controllers, or devices as are known in the art. Some embodiments of the invention may include buffers, registers, stacks, storage units and/or memory units, for temporary or long-term storage of data or in order to facilitate the operation of a specific embodiment.

Some embodiments of the invention may be implemented, for example, using a machine-readable medium or article which may store an instruction or a set of instructions that, if executed by a machine, for example, by system 100 of FIG. 1, by station 101 of FIG. 1, by processor 111 of FIG. 1, or by other suitable machines, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit (e.g., memory unit 114 or storage unit 115), memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
   a first wireless transceiver able to operate in accordance with a first, non-scheduled, wireless communication protocol;
   a second wireless transceiver able to operate in accordance with a second, scheduled, wireless communication protocol; and
   a communication coordinator to allocate one or more first time slots for communication by said first transceiver, and to allocate one or more second time slots, which do not overlap said first time slots, for communication by said second transceiver,
   wherein the first transceiver is to transmit to one or more wireless communication devices operating in accordance with the first wireless communication protocol a first silence period notification including one or more parameters defining the second time slots and requesting to withhold communication during the second time slots,
   and wherein the second transceiver is to transmit to one or more wireless communication devices operating in accordance with the second wireless communication protocol a second silence period notification including one or more parameters defining the first time slots,
   wherein the second silence period notification includes a first parameter having a value corresponding to a duration of one of said first time slots, and a second parameter having a value corresponding to a duration of one of said second time slots.

2. The apparatus of claim 1 wherein, during the first time slot the first transceiver is in operational mode and the second transceiver is in non-operational mode, and wherein during the second time slot the second transceiver is in operational mode and the first transceiver is in non-operational mode.

3. The apparatus of claim 1, wherein said communication coordinator is to alternate between said first time slots and said second time slots in accordance with an orderly Time-Divisional Multiple Access scheme.

4. The apparatus of claim 3, wherein said communication coordinator is to allocate one or more transition time slots in between said first and second time slots, and wherein said first and second transceivers are both non-operational during said one or more transition time slots.

5. The apparatus of claim 1, further comprising a shared Radio Frequency wireless communication component, wherein the first wireless transceiver is able to access said shared Radio Frequency wireless communication component during the first time slots, and wherein the second wireless transceiver is able to access said shared Radio Frequency wireless communication component during the second time slots.

6. The apparatus of claim 5, wherein the first transceiver is to indicate to the second transceiver a start of an access by the first transceiver to said shared Radio Frequency wireless communication component, and a duration of said access.

7. The apparatus of claim 5, wherein said shared Radio Frequency wireless communication component comprises a shared Radio Frequency antenna able to transmit and receive wireless communication signals.

8. The apparatus of claim 1, wherein said first silence period notification comprises:
    a silence duration parameter having a value corresponding to a duration of said second time slot; and
    a silence periodicity parameter having a value corresponding to a duration of a period of repetition of the second time slot, wherein the period of repetition includes one of the first time slots and one of the first time slots.

9. The apparatus of claim 1, wherein the second silence period notification includes a periodic scan request including a scan duration parameter and an interleaving interval parameter, wherein the scan duration parameter has a value corresponding to a duration of one of said first time slots and two transition time slots during which said first and second transceivers are both non-operational, and wherein the interleaving interval parameter has a value corresponding to a duration of one of said second time slots.

10. The apparatus of claim 9, wherein the periodic scan request further comprises a scan iteration parameter having a value corresponding to an estimated time allocated for a communication session including a sequence of one or more of said first time slots and one or more of said second time slots.

11. The apparatus of claim 1, wherein the first wireless transceiver is to transmit during at least one of said first time slots a Clear-to-send To Self frame, which is not directly followed by transmission of a data frame from the first wireless transceiver, to withhold communication in accordance with the first wireless communication protocol during at least one of said second time slots, wherein the Clear-to-send To Self frame includes a duration field having a value which is based on the duration of the at least one of the second time slots.

12. The apparatus of claim 1, wherein the first transceiver is to set a beacon interval of an Independent Basic Service Set including the first transceiver to an integer multiple of the sum of the durations of one of the first time slots, one of the second time slots and two transition time slots during which said first and second transceivers are both non-operational.

13. The apparatus of claim 12, wherein the first transceiver to set a Transmission Opportunity period of the Independent Basic Service Set, and to transmit a Clear-to-send To Self frame which is not followed by a data frame no longer than a priority-inter-frame-space time period within the Transmission Opportunity period.

14. The apparatus of claim 1, wherein said first wireless communication protocol is IEEE 802.11 standard and said second wireless communication protocol is IEEE 802.16 standard.

15. A method comprising:
    allocating one or more first time slots for communication by a first wireless transceiver able to operate in accordance with a first, non-scheduled, wireless communication protocol;
    allocating one or more second time slots, which do not overlap said first time slots, for communication by a second wireless transceiver collocated with the first transceiver in a common wireless communication station, the second transceiver able to operate in accordance with a second, scheduled, wireless communication protocol;
    transmitting from the first transceiver to one or more wireless communication devices operating in accordance with the first wireless communication protocol a first silence period notification including one or more parameters defining the second time slots and requesting to withhold communication during the second time slots; and
    transmitting from the second transceiver to one or more wireless communication devices operating in accordance with the second wireless communication protocol a second silence period notification including one or more parameters defining the first time slots wherein the second silence period notification includes a first parameter having a value corresponding to a duration of one of said first time slots, and a second parameter having a value corresponding to a duration of one of said second time slots.

16. The method of claim 15, wherein said first silence period notification comprises:
    a silence duration parameter having a value corresponding to a duration of said second time slot; and
    a silence periodicity parameter having a value corresponding to duration a of a period of repetition of the second time slot, wherein the period of repetition includes one of the first time slots and one of the first time slots,
    and wherein the second period notification includes a periodic scan request including a scan duration parameter and an interleaving interval parameter, wherein the scan duration parameter has a value corresponding to a duration of one of said first time slots and two transition time slots during which said first and second transceivers are both non-operational, and wherein the interleaving interval parameter has a value corresponding to a duration of one of said second time slots.

17. The method of claim 15 comprising transmitting during at least one of said first time slots a Clear-to-send To Self frame, which is not directly followed by transmission of a data frame from the first wireless transceiver, to withhold communication in accordance with the first wireless communication protocol during at least one of said second time slots, wherein the Clear-to-send To Self frame includes a duration field having a value which is based on the duration of the at least one of the second time slots.

18. The method of claim 15 comprising:
    setting a beacon interval of an Independent Basic Service Set including the first transceiver to an integer multiple of the sum of the durations of one of the first time slots, one of the second time slots and two transition time slots during which said first and second transceivers are both non-operational.

19. The method of claim 18 comprising:
setting a Transmission Opportunity period of the Independent Basic Service Set; and
transmitting a Clear-to-send To Self frame, which is not followed by a data frame, no longer than a priority-inter-frame-space time period within the Transmission Opportunity period.

20. The method of claim 15 comprising:
joining the first transceiver into a first Independent Basic Service Set in accordance with said first wireless communication protocol;
checking whether one or more parameters of the first Independent Basic Service Set are in accordance with the allocation of the first and second time slots; and
if it is determined that the parameter of the first Independent Basic Service Set is not in accordance with the allocation of the first and second time slots, initiating a second Independent Basic Service Set in accordance with the first wireless communication protocol, wherein a Service Set Identifier of the second Independent Basic Service Set is identical to a Service Set Identifier of the first Independent Basic Service Set, and wherein a Timing Synchronization Function value of the second Independent Basic Service Set is greater than a Timing Synchronization Function value of the first Independent Basic Service Set.

21. A wireless communication system comprising:
a wireless communication station comprising:
  a dipole antenna to transmit and receive wireless communication signals;
  a first wireless transceiver able to operate in accordance with a first, non-scheduled, wireless communication protocol;
  a second wireless transceiver able to operate in accordance with a second, scheduled, wireless communication protocol; and
  a communication coordinator to allocate one or more first time slots for communication by said first transceiver, and to allocate one or more second time slots, which do not overlap said first time slots, for communication by said second transceiver,
wherein the first transceiver is to transmit to one or more wireless communication devices operating in accordance with the first wireless communication protocol a first silence period notification including one or more parameters defining the second time slots and requesting to withhold communication during the second time slots,
wherein the second transceiver is to transmit to one or more wireless communication devices operating in accordance with the second wireless communication protocol a second silence period notification including one or more parameters defining the first time slots, and wherein the second silence period notification includes a first parameter having a value corresponding to a duration of one of said first time slots, and a second parameter having a value corresponding to a duration of one of said second time slots.

22. The wireless communication system of claim 21, wherein during the first time slot the first transceiver is in operational mode and the second transceiver is in non-operational mode, and wherein during the second time slot the second transceiver is in operational mode and the first transceiver is in non-operational mode.

23. The wireless communication system of claim 21, wherein said first silence period notification comprises:
  a silence duration parameter having a value corresponding to a duration of said second time slot; and
  a silence periodicity parameter having a value corresponding to duration of a period of repetition of the second time slot, wherein the period of repetition includes one of the first time slots and one of the first time slots.

24. The wireless communication system of claim 21, wherein the second silence period notification includes a periodic scan request including a scan duration parameter and an interleaving interval parameter, wherein the scan duration parameter has a value corresponding to a duration of one of said first time slots and two transition time slots during which said first and second transceivers are both non-operational, and wherein the interleaving interval parameter has a value corresponding to a duration of one of said second time slots.

25. The wireless communication system of claim 21, wherein the first wireless transceiver is to transmit during at least one of said first time slots a Clear-to-send To Self frame, which is not directly followed by transmission of a data frame from the first wireless transceiver, to withhold communication in accordance with the first wireless communication protocol during at least one of said second time slots, wherein the Clear-to-send To Self frame includes a duration field having a value which is based on the duration of the at least one of the second time slots.

* * * * *

UNITED STATES PATENT AND TRADEMARK OFFICE
CERTIFICATE OF CORRECTION

PATENT NO. : 7,778,226 B2
APPLICATION NO. : 11/392958
DATED : August 17, 2010
INVENTOR(S) : Giora Rayzman et al.

Page 1 of 1

It is certified that error appears in the above-identified patent and that said Letters Patent is hereby corrected as shown below:

On the title page, in item (56), under "OTHER PUBLICATIONS", in column 2, line 1, delete "Standrd" and insert -- Standard --, therefor.

In column 19, line 32, in Claim 8, after "and" delete "one of the first" and insert -- one of the second --, therefor.

In column 20, line 45, in Claim 16, after "and" delete "one of the first" and insert -- one of the second --, therefor.

In column 22, line 27, in Claim 23, after "and" delete "one of the first" and insert -- one of the second --, therefor.

Signed and Sealed this
Fourth Day of January, 2011

David J. Kappos
*Director of the United States Patent and Trademark Office*